United States Patent
De Luca et al.

[15] 3,656,057
[45] Apr. 11, 1972

[54] SAFETY TERMINATOR WITH TESTING AND PULLING MEANS

[72] Inventors: Carlo Bruno De Luca, Monroe, Conn.; Allan Mallanik, Spring Lake, Mich.

[73] Assignee: Burndy Corporation

[22] Filed: Nov. 5, 1970

[21] Appl. No.: 87,240

[52] U.S. Cl. ..................... 324/133, 174/5 SG, 174/11 BH, 339/110 R, 339/143 R, 339/147 P
[51] Int. Cl. .................................................. G01r 19/16
[58] Field of Search ............. 174/5 R, 5 SG, 11 BM, 18, 73 R, 174/142, 143; 317/257; 324/133; 339/14 R, 14 L, 45 R, 110 R, 110 C, 113 R, 136 R, 143 R, 143 C, 147 P

[56] References Cited

UNITED STATES PATENTS

| | | | |
|---|---|---|---|
| 3,343,153 | 9/1967 | Waehner | 324/133 X |
| 3,390,331 | 6/1968 | Brown et al. | 174/73 R UX |
| 3,401,370 | 9/1968 | Weinfurt et al. | 174/11 BH UX |
| 3,512,118 | 5/1970 | Leonard | 174/18 UX |
| 3,513,394 | 5/1970 | Tachick | 324/133 |

Primary Examiner—Laramie E. Askin
Attorney—Howard S. Reiter

[57] ABSTRACT

A terminator is equipped with a ring whereby it may be pulled off a contact such as the electrode of a transformer. The ring is pivoted to a metal bracket extending outside the terminator from a capacitor plate embedded within the body of the terminator in closely spaced relation to a current carrying contact also within the terminator body. Therefore, a suitable tool applied to the ring or the bracket can indicate whether or not the terminator contact is conducting electricity. While the terminator body is covered by a conductive coating, the bracket extends through an uncoated part of the terminator surface so as to be capable of being charged with the capacitor. When the ring is to be used for pulling the terminator, it must be grounded to the coated terminator surface to permit its safe use.

5 Claims, 3 Drawing Figures

PATENTED APR 11 1972 3,656,057

INVENTORS
CARLO BRUNO DeLUCA
BY ALLAN MALLANIK

Howard S. Reiter
ATTORNEY.

SAFETY TERMINATOR WITH TESTING AND PULLING MEANS

BACKGROUND OF THE INVENTION

This invention relates to a terminator of the type that is adapted to be applied to the electrode of a transformer, or to any other type of electrode, for establishing an electric circuit. Terminators of the particular class are naturally adapted to conduct current at extremely high voltages, and for that reason, must be specially constructed. Thus, it is important to provide some means whereby the terminator may be readily pulled manually from its electrode without endangering the operator. Also, it is extremely important to be able to provide a test point for testing whether or not the terminator is actually conducting electricity.

DESCRIPTION OF PRIOR ART

There are naturally numerous mechanisms whereby terminators may be pulled from electrodes, and testing devices for testing whether or not a terminator is conducting electricity and is "live". However, the novel combination of means for providing safety, testing and pulling mechanism, all as will be outlined below, is believed to be entirely novel and unique.

SUMMARY OF INVENTION

This invention comprises an extremely simple mechanism whereby a pulling device, such as a ring or the like, may be applied to a terminator, so that a pulling tool in the form of a simple hook may readily pull the terminator off an electrode. As a feature of the invention, the pulling device or ring is mounted on a part through which the terminator may be tested to determine whether or not it is conducting electricity. As a still further feature of the invention, this part may be a capacitor, which together with the pulling device, is effectively grounded, when the pulling device is used for pulling the terminator off its electrode.

More, particularly, the invention provides a terminator equipped with a capacitor that is preferably embedded in the terminator in spaced relation to the usual conductor within the terminator. The capacitor has parts extending outwardly of the terminator, and on these parts may be mounted or formed a pulling device such as a pulling ring or eye. Therefore, the capacitor has a dual function. It supports the pulling eye and functions to allow detection of current flow.

The body of the terminator is naturally formed of insulating material, and to ground it effectively when it is applied to a terminal such as an electrode, a coating of conductive material is applied to the terminator. As a feature of the invention, the pulling eye or ring, when in a position to apply pull to the terminator, is grounded to the conductive surface of the terminator, either through direct contact or preferably through a metal part that may act as a detent, and which is secured to the surface of the terminator. It will be appreciated that the pulling eye will therefore ground the capacitor during the pulling operation, while it is through the capacitor itself that the terminator may be pulled off a terminal. Those skilled in the art will understand that through an ingenious assembly of several parts, all as will be more fully explained in the specification, this invention contributes features of extreme importance in this art.

DESCRIPTION OF DRAWINGS

Referring now to the drawings,

FIG. 1 is a perspective view of the elbow terminator illustrating the manner in which the pulling ring of the invention may be rotated relatively to parts extending from the capacitor, so as to ground the capacitor.

DESCRIPTION OF A PREFERRED FORM OF THE INVENTION

Figure 1:
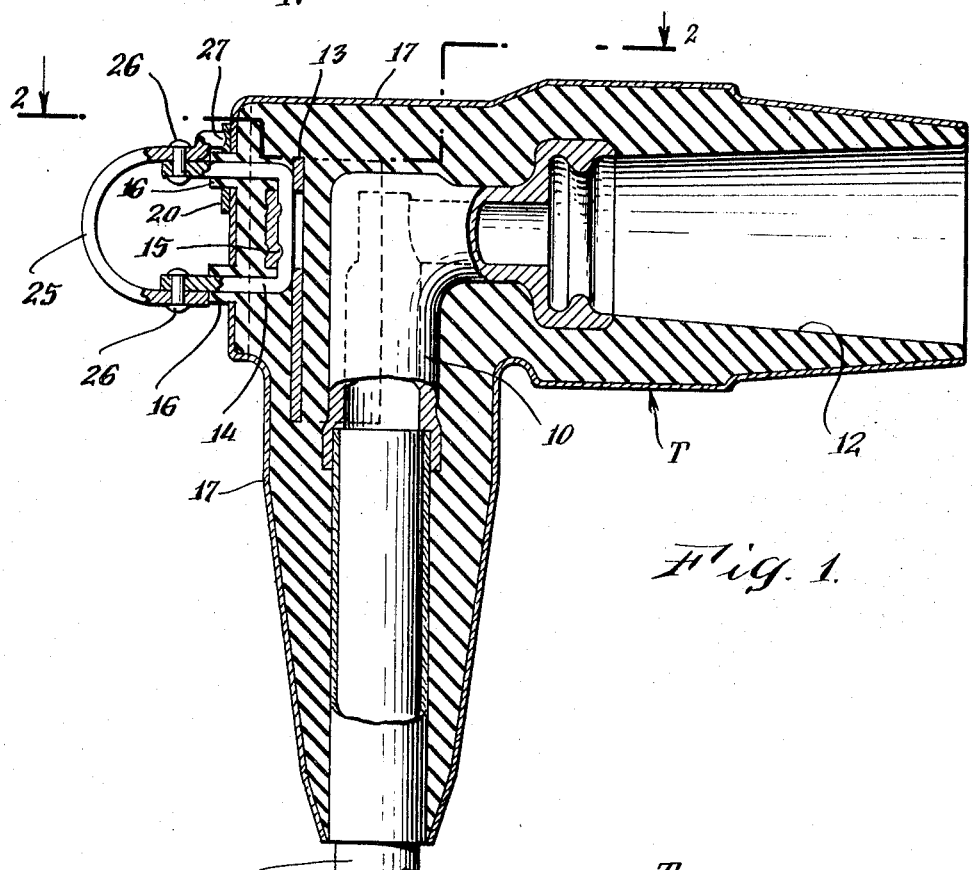
FIG. 1 is a section taken through a typical elbow type of terminator illustrating the invention of this application applied thereto.

Referring now more particularly to the drawings, the reference letter T refers to an elbow terminator, the configuration of which is well illustrated in FIG. 1. This is a standard type of terminator adapted to be applied to a standard type of electrode extending from a transformer. As already outlined earlier, the invention may be incorporated in any type of terminator or other type of electricity conducting element that must be applied and removed from electrodes, contacts, or the like.

Figure 2:
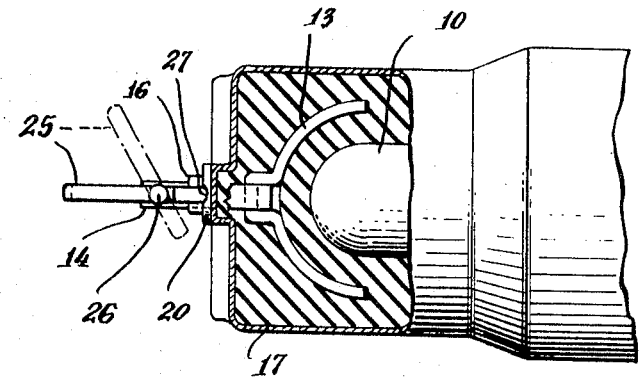
FIG. 2 is a section taken along line 2—2 of FIG. 1.

The body of the terminator is formed of a suitable insulating material well shown in section in FIGS. 1 and 2, and embedded in the body of the insulating material as it is cast, is any suitable type of current conducting element 10 in which may be secured a conductor 11. When the part 12 of the terminator T is applied to an electrode of a transformer, it is obvious that current will flow from the conductors 11 and 10 to the transformer, as is well known and understood in the art.

A curved plate 13, is also embedded in the non-conducting or insulating body of the terminator T during the casing of the body of the terminator. The plate 13 is curved so as to correspond generally to the curved configuration of the current conducting contact 10 as well illustrated in FIG. 2, where the curved plate 13 is shown spaced from the contact 10. Because of the relatively high voltage that is carried by the contact 10, the plate 13 will be effectively charged so that a suitable tool such as a high impedance Ross meter may readily be utilized to measure and determine the flow of current through the contact insert 10 and terminator T.

Figure 3:
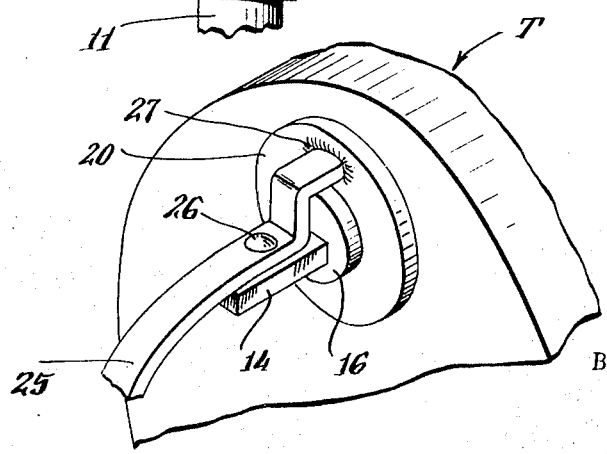

A U-shaped bracket 14 is riveted as at 15 to the capacitor plate 13 so as to become an integral part thereof, and when the body of the terminator is cast, the upper and lower legs of the U bracket 14 extend outwardly of the terminator body as well illustrated in FIGS. 1 and 3. Preferably, the two legs extend outwardly through a pair of abutments, one of which is designated 16 in FIG. 3 where the abutment is most clearly shown.

The purpose of the abutments, is to provide insulting surfaces for insulating the two legs of the U-shaped bracket 14 from the remainder of the outer surface of the terminator T. This outer surface of the terminator is coated as illustrated at 17 by a current conducting coating so as effectively to ground the terminator where it touches a part of the body of a transformer, when applied to a transformer. This naturally renders the terminator relatively safe under ordinary circumstances. The coating 17 is not applied to the parts 16, so that the two legs of the U bracket 14 will be effective to permit the use of a Ross meter to determine whether or not the contact 10 is conducting current to a degree sufficient to apply a charge to the curved capacitor plate 13.

A circular metal plate 20 is applied about the upper circular abutment 16, and against the outer coated surface of the terminator T as well illustrated in the several figures of the drawing, for a purpose to be indicated presently. At the moment, it will be well to understand that while the two abutments 16 are not coated, and are therefore not grounded as is the remainder of the terminator T, the plate 20 is grounded because of application to the coated body of the terminator.

A metal ring 25 is pivoted at 26 to each of the legs of the U bracket 14 so as to pivot relatively to the bracket as well illustrated in the drawings. In the full line position of the ring 25 illustrated in FIG. 2, one offset end portion thereof is adapted to lie within detent depression 27 in plate 20, so that the ring 25 is held yieldingly in the particular position. It will be appreciated, that in this position of the ring, it is grounded through contact with the plate 20, to the grounded body of the terminator T through the coated surface 17 thereof. The ring 25 is placed in this position shown in FIGS. 2 and 3, whenever it is desired to pull the terminator T away from an electrode. In other words, when the terminator is to be pulled off an electrode, the ring 25, for the purpose of safety, will be effectively grounded with the remainder of the terminator. On the other hand, when the terminator is to be tested to determine whether or not current is flowing through the contact element 10 and conductor 11, the ring 25 is moved to its dash and dotted line position of FIG. 2, in which position, it is no longer grounded, therefore leaving the cpacitor 13 and the bracket 14, also ungrounded. Now, a tool such as the Ross meter may be applied to the bracket 14 or to the ring 25, to determine whether or not the capacitor 13 is charged because of the passage of current through the terminator.

It will therefore be appreciated, that through the extremely simple means utilized, the terminator may be pulled off an electrode by ring 25, with the ring 25 together with the capacitor 13 to which it is secured, grounded, the capacitor itself forming part of the means through which the terminator is pulled off the electrode. When the pulling ring 25 and the capacitor 13 are thus utilized for pulling the terminator off the electrode, the pulling ring and the capacitor are both grounded to contribute safety. It will further be appreciated, that the functioning of the capacitor and the pulling ring for pulling the terminator off an electrode with the entire assembly grounded, does not interfere with the functioning of the capacitor, when it is desired to test whether or not the capacitor is charged because of the passage of the high voltage current through the terminator.

The effectiveness and valve of the invention will now be quite apparent to those skilled in the art.

We now claim:

1. In a terminator of the class having a body formed of insulating material with a conductor inside the body adapted to engage a terminal or the like to transmit electricity to said conductor:

a capacitor element within said body spaced from and capacitively coupled to said conductor;

means extending from said capacitor element to the surface of said body for permitting testing to determine the presence of electrical energy in said conductor;

a conductive coating on the outer surface of said body for grounding said body;

pulling means to transmit force to said body for separating said terminator from a terminal or the like, said pulling means being pivotally coupled to said means extending from said capacitor element and being anchored against separation therefrom in the pulling direction;

and, grounding means coupled to said pulling means, electrically grounding said capacitor element to said conductive coating through said means extending from said capacitor element, when said pulling means is pivoted to a given position.

2. In the combination of claim 1, the feature that said pulling device when in a position to be used for pulling said body is in grounded position.

3. In the combination of claim 1, the feature that said capacitor element has a pair of arms extending outwardly of said body through uncoated portions of said body, said pulling device being pivoted to each of said arms, and a part of said pulling device contacting a part on said body for grounding said pulling device when said pulling device is pivoted into a pull position.

4. In the combination of claim 3, the feature that said part of said body through which said pulling device is grounded, functions as a detent to hold said pulling device in pulling position.

5. In the combination of claim 1, the feature that said capacitor element is the means through which said pulling device applies pulling force to pull said terminator off a terminal or the like.

* * * * *